United States Patent Office 3,573,136
Patented Mar. 30, 1971

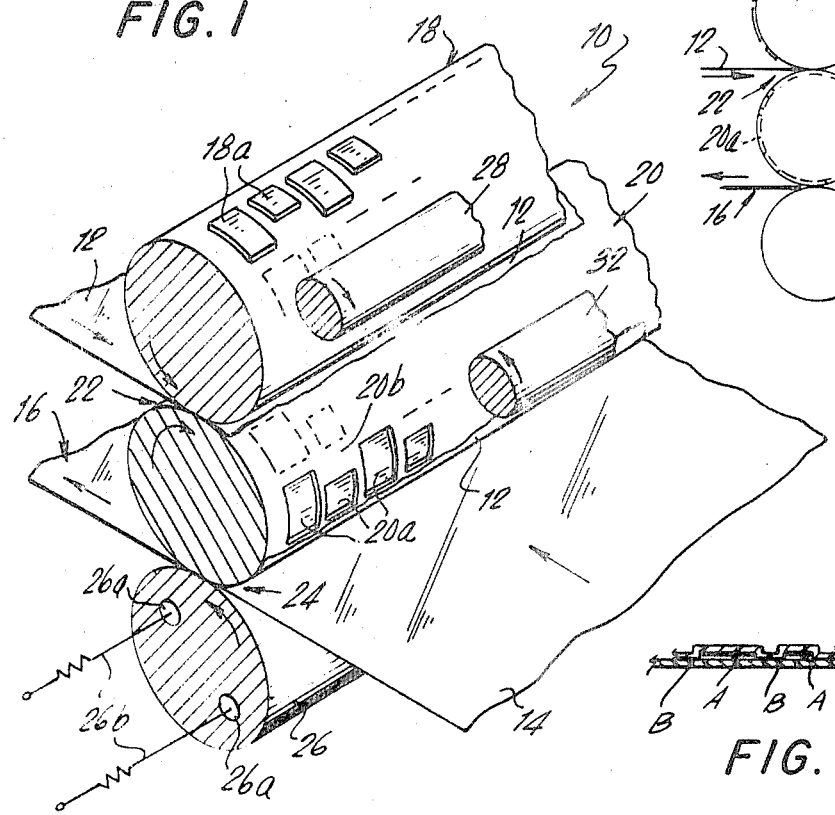
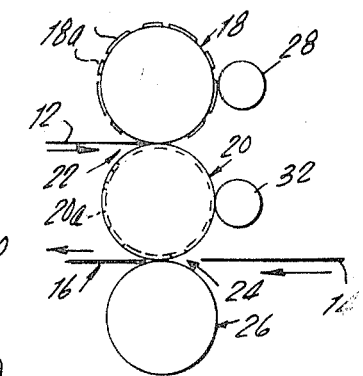
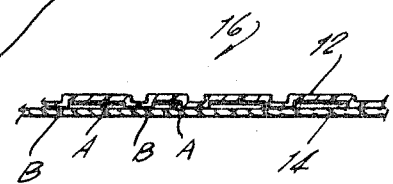
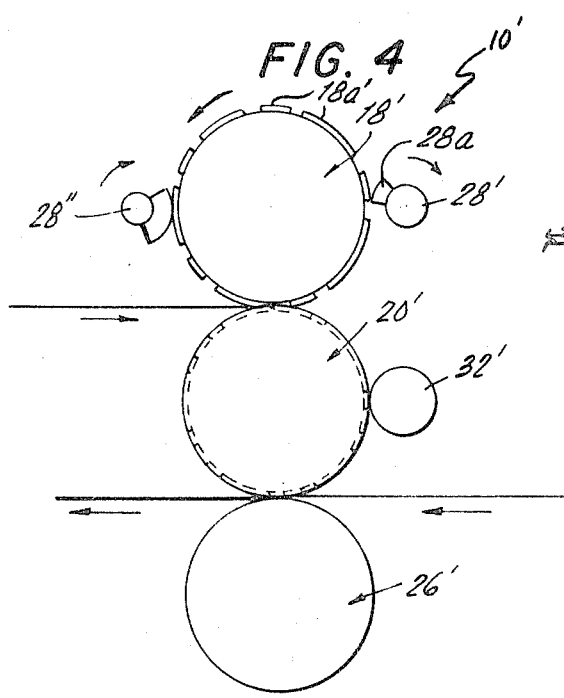
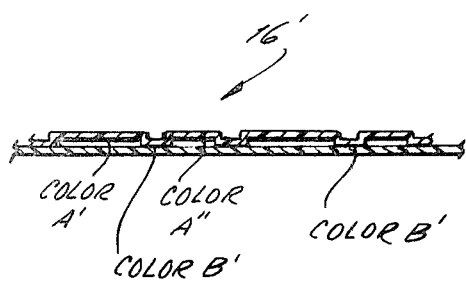

3,573,136
WEB PRINTING AND EMBOSSING APPARATUS
Harry Gardner, Upper Saddle River, N.J., assignor to Multitone Plastics Engraving Company, Inc., Rochelle Park, N.J.
Filed Jan. 30, 1968, Ser. No. 701,651
Int. Cl. B41m 7/00
U.S. Cl. 156—384
7 Claims

ABSTRACT OF THE DISCLOSURE

Apparatus for applying two-color printing to a plastic web in conjunction with embossment of the plastic web, wherein use is made of an intermeshing pair of male and female embossing rollers. One color is transferred to the embossed web areas by the raised areas of the male embossing roller and the second color is applied to the non-embossed areas of the web while it is on the female embossing roller, with the result that without special registration of the color-applying rollers the plastic web receives selected colors in predetermined areas. Subsequent lamination of the plastic web is also achieved while the web is on the female embossing roller to thereby minimize flattening of the embossed areas by the heat and pressure of lamination.

The present invention relates generally to decorative finishing of plastics, and more specifically to improvements in printing and embossing apparatus for plastic web materials.

The range of uses of plastics is understandably increased by the application of multi-color printing and embossed patterns which correspondingly enhance the appearance of this material. This treatment of plastics using presently known and available printing and embossing apparatus, however, adds substantially to manufacturing costs. Also, in many instances the decorated plastic sheet is further laminated to a stronger and tougher substrate plastic, and the mode of operation of the apparatus does not lessen or minimize the flattening or other adverse effects on the embossing of the decorated plastic sheet caused by the heat and pressure of lamination.

Broadly, it is an object of the present invention to provide an improved printing and embossing apparatus for plastics overcoming the foregoing and other shortcomings of the prior art apparatus. Specifically, it is an object to provide apparatus for economically applying multi-color printing to a plastic web which is also embossed and, in the improved mode of operation of this apparatus, also effectively preserve the embossing thereon during subsequent lamination of the plastic web.

A plastic web printing and embossing apparatus demonstrating objects and advantages of the present invention includes a cooperating pair of male and female embossing rollers in the operation of which the raised embossing segments of the male roller actually intermesh, somewhat like teeth on gears, with correspondingly recessed areas on the female roller. The one color of printing destined for the embossed web areas is readily applied to these areas by being first applied to the raised embossed segments of the male embossing roller and thereafter transferred to these web areas during embossing. The other color, destined for the remaining web areas, is applied directly to these web areas after completion of the embossing step and while the web is still trained about the female embossing roller, these web areas being supported by the raised areas of the female roller and thus advantageously presented for printing. While the web is still trained about the female embossing roller and the embossing thereon is thus still within the protection of the recessed areas of this roller, the web is fed, by rotation of this roller, through a lamination bight and consequently the heat and pressure of lamination does not flatten or otherwise adversely affect the embossed pattern.

The above brief description, as well as further objects, features and advantages of the present invention, will be more fully appreciated by reference to the following detailed description of presently preferred but nonetheless illustrative embodiments in accordance with the present invention, when taken in conjunction with the accompanying drawings, wherein:

FIG. 1 is a partial perspective view diagrammatically illustrating a two-color web printing and embossing apparatus according to the present invention;

FIG. 2 is a side elevational view illustrating further structural features thereof;

FIG. 3 is a sectional view of the laminated product produced by the embodiment of FIGS. 1, 2;

FIG. 4 is a side elevational view similar to FIG. 2 but of a second embodiment of a web printing and embossing apparatus according to the present invention; and FIG. 5 is a sectional view of the laminated product produced by the second embodiment of FIG. 4.

Reference is now made to the drawings and in particular to FIGS. 1–3 illustrating a first embodiment of an apparatus, generally designated 10, and product 16 of the present invention. In practice, the apparatus 10 prints and embosses a first web material 12, preferably a clear plastic such as polyethylene or the like, and subsequently fuses or laminates the plastic web 12 to a stronger substrate web material 14. The resulting composite material 16 has utility as a wall or floor covering having, for this purpose, the already noted plastic sheet 12 finished with a decorative printed and embossed design. Among the significant features of the apparatus 10 are its ability to print at least two colors in specified locations on the plastic web 12 so as to accurately reproduce any two-color design, and its functioning such that despite the subsequent lamination of the substrate web material 14 to the embossed plastic web 12 that the previously created embossing pattern is not flattened out or otherwise adversely affected by the heat and pressure exerted during lamination.

To the end of achieving the foregoing and other such desirable commercial results, the apparatus 10 includes a cooperating pair of male and female embossing rollers 18, 20 each appropriately journaled in a conventional manner for rotation and defining a first bight 22 therebetween for initially receiving the plastic web 12. The upper or male embossing roller 18 has an embossing surface consisting of raised embossing areas 18a in various shapes and layout to reproduce a corresponding embossed pattern in the plastic web 12.

The female embossing roller 20 has a cooperating embossing surface consisting of recesses 20a which accommodate the raised areas 18a at the bight 22; that is, the male and female rollers 18 and 20 are in meshing engagement with each other in the bight 22 and thus cooperate to produce the embossed pattern in the plastic web 12.

Operatively arranged to define a second bight 24 with the female embossing roller 20 is a heating or laminating roller 26, appropriately journaled for rotation, and including conventional heating elements 26a electrically energized by conductors 26b. In practice, the substrate 14 is fed into the bight 24 and during travel therethrough the heat generated by the heating roller 26 as well as the pressure exerted by this roller is effective, as generally understood, in causing the fusing or laminating of the plastic substrate 14 to the previously printed and embossed plastic web 12. It is significant to note that since the embossed areas of the plastic web 12 are contained within the recesses 20a of the female embossing roller 20 at the entrance and during travel of the same through the laminating bight 24 that the heat and pressure of lamination does not have any tendency to flatten or otherwise adversely affect these embossed areas of the plastic web 12.

As for the printing applied to the plastic web 12, this is achieved by conventional printing rollers 28, 32 operating in a well understood manner to transfer a coloring medium to the plastic web 12. More particularly, a first color A is applied to the plastic web 12 by a first printing roller 28 journaled for rotation in contact with the male embossing roller 18 at a location prior to the first bight 22. As a consequence, the roller 28 contacts the raised areas 18a on the male embossing roller 18 and the coloring medium A is thus applied to these raised areas 18 and is subsequently transferred upon contact with the plastic web 12 onto the areas thereof coextensive with the areas contained within the recesses 20a of the female embossing roller 20.

A second color B of printing medium is applied to the plastic web 12 by a second printing roller 32 journaled for rotation so as to contact the female embossing roller 20 at a location between the first and second bights 22, 24, as clearly shown in FIGS. 1, 2. As a consequence, the roller 32 is effective in applying the color medium B to the raised area on the female embossing roller 20 or what amounts to the non-embossed areas 20b surrounding the embossed areas 20a. In the application of the coloring medium B there may be some inadvertent spillage into the recessed areas 20a but as this will fall on top of the previously applied color medium A it will be masked by this previous application of color and therefore will not be visible through the transparent plastic sheet 12. In this manner therefore the coloring mediums A, B are applied in precise areas on the plastic web 12 without any need to register the printing rollers 28, 32 in relation to the plastic sheet 12 or to each other.

As already noted, the final step consists of laminating the substrate 14 to the surface of the plastic sheet 12 having the applied coloring medium A, B. In the resulting composite product 16, therefore, the coloring mediums A, B are on an interior protected surface of the composite product. This has obvious benefits when the sheet 16 is converted to such end products as floor tile and the like since the applied printing mediums A, B are protected against scuffing and other such abuse which occurs during normal use of the product.

Reference is now made to FIGS. 4, 5 illustrating a second embodiment of the apparatus hereof in which similar parts are designated by the same but primed reference numerals. For brevity's sake only the different features will be described. The main different feature consists primarily of the composite material 16' having three colors, A', A" and B'. To achieve this, two printing rollers 28' and 28" are circumferentially spaced about and in contact with the male embossing roller 18' and are each conventionally adapted to print in only select areas of the raised areas 18a' of the embossing roller 18'. Taking roller 28', for example, it includes surface segments 28a of an extent and circumferentially spaced so as to contact only the smaller raised areas 18a'; the other printing roller 28" being similarly designed to contact the other or larger portions of the raised embossing areas 18a'. In all other major respects the embodiment 10' of FIG. 4 is similar to the embodiment 10 of FIGS. 1, 2.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

What is claimed is:

1. A web printing and embossing apparatus comprising a male embossing roller having a raised embossing pattern thereon, a female embossing roller having a recessed embossing pattern thereon cooperating with said raised embossing pattern and operatively arranged in relation to said male embossing roller to define a first bight for receiving a first web material therein preparatory to printing and embossing said first web material, a heating roller operatively arranged in relation to said female embossing roller to define a second bight for receiving a second web material therein preparatory to laminating together said first and second web materials, a first color-applying means having an operative position in advance of said first bight effective to apply a first coloring medium to said raised embossing pattern on said male embossing roller for transfer to the embossed area of said first web material, and a second color-applying means having an operative position between said first and second bights effective to apply a second coloring medium to the area on said first web material which is not embossed, whereby said coloring mediums are applied in predetermined different locations on said first web material on the surface thereof which is laminated to said second web material.

2. A web printing and embossing apparatus as defined in claim 1 wherein said first color-applying means includes at least one coloring roller in contact with said male embossing roller.

3. A web printing and embossing apparatus as defined in claim 1 wherein said first color-applying means includes plural coloring rollers circumferentially spaced about and in contact with said male embossing roller and operatively arranged to apply coloring medium in predetermined areas of said raised embossing pattern of said male embossing roller.

4. A web printing and embossing apparatus as defined in claim 1 wherein said first and second color-applying means each include at least one coloring roller in contact with said male embossing roller and with said female embossing roller, respectively.

5. A web printing and embossing apparatus as defined in claim 1 wherein said cooperating male and female embossing rollers and said heating roller are operatively arranged in vertical alignment with each other.

6. A web printing and embossing apparatus comprising a male embossing roller having a raised embossing pattern thereon, a female embossing roller having a recessed embossing pattern thereon cooperating with said raised embossing pattern and operativly arranged in relation to said male embossing roller to define a first bight for receiving a first web material therein preparatory to printing and embossing said first web material, a heating roller operatively arranged in relation to said female embossing roller to define a second bight for receiving a second web material therein preparatory to laminating together said first and second web materials, at least one coloring roller in contact with said male embossing roller in an operative position in advance of said first bight effective to apply a coloring medium to said raised embossing pattern for subsequent transfer to the embossed area of said first web material, and at least a second coloring roller in contact with said female embossing roller in an operative position between said first and second bights effective to apply another coloring medium to the area of said first web material which is not embossed, whereby said coloring mediums are applied at predetermined different locations on said first web material on the surface thereof which is laminated to said second web material.

7. A web printing and embossing apparatus as defined in claim 6 wherein said cooperating male and female embossing rollers and said heating roller are operatively arranged in vertical alignment with each other.

References Cited
UNITED STATES PATENTS

| | | | |
|---|---|---|---|
| 680,533 | 8/1901 | Marinier et al. | 161 Embossing Digest |
| 3,026,231 | 3/1962 | Chavannes | 161 Embossing Digest |
| 3,236,712 | 2/1966 | Mason | 156—277X |
| 3,399,101 | 8/1968 | Magid | 156—387X |

BENJAMIN A. BORCHELT, Primary Examiner

R. E. HART, Assistant Examiner

U.S. Cl. X.R.

161 Embossing Digest